Patented Nov. 13, 1928.

1,691,454

UNITED STATES PATENT OFFICE.

HOWARD W. AMBRUSTER, OF WESTFIELD, NEW JERSEY.

MANUFACTURE OF INSECTICIDES.

No Drawing.   Application filed December 4, 1923. Serial No. 678,434.

The invention relates to improvements in the manufacture of insecticides, and the main object of the invention is to produce an effective and advantageous insecticide cheaply in large quantity. The common forms of insecticides such as Paris green, arsenate of lead, calcium arsenate, etc. are produced by various chemical processes which are relatively expensive and from materials which are limited or vary in availability, resulting in relatively high cost. It has been considered necessary to use such expensive chemical processes for several reasons. It has been considered that a product having a relatively high toxic value was necessary and that such could only be produced by such expensive chemical processes. With products containing a considerable quantity of water-soluble poison, such as certain arsenites, it is found that such water-soluble poison injures the plants or foliage which the insecticide is supposed to protect from insects. In order to avoid the presence of substantial quantities of such disadvantageous water-soluble poisons it has been considered necessary to use the expensive chemical processes whereby a product sufficiently free from such water-soluble material could be obtained. Furthermore an effective insecticide must be in an extremely fine state of sub-division in order that it may be absorbed by the insect and it has been the common understanding that such state of sub-division of fineness in an insecticide could only be produced by chemical precipitation.

I have discovered however that it is possible to produce a practical insecticide without using such expensive chemical processes and from a raw material which is cheap and plentiful whereby a new insecticide is produced at relatively low cost.

In carrying out the invention to produce such an insecticide I use as a base a natural ore containing an insecticidal poison and treat this ore mechanically to produce a fine powder therefrom, the same being sufficiently finely pulverized for the poison therein to be absorbed by insects with insecticidal result. As ores I may use many of the natural ores and mineral substances containing poisons such as arsenic, copper, lead, zinc, barium and sulphur compounds etc. which are present in the ore in form available for insecticidal purposes. For example I may use as the principal ingredient the ore Scorodite which is understood to consist primarily of an arsenate of iron although it generally contains some copper and other matter. This poisonous arsenate of iron I find is, in certain deposits, practically insoluble in water and is not susceptible to easy oxidation when applied moist to plants or dusted thereon and thereafter wetted with dew. While the percentage of insecticidal poison in such ore varies considerably I have discovered that there are certain natural deposits of Scorodite containing a sufficiently large proportion of insect poison and that these deposits form a plentiful and cheap source of supply, and that the ore may be formed into a practical insecticide by pulverizing the same, as for example by sufficient grinding in a suitable mill. That is, it is only necessary to pulverize the mineral to produce a powder therefrom which is sufficiently finely divided for the poison to be absorbed by insects with insecticidal result. I find that this fine pulverization does not increase materially, if at all, the water solubility of the normally insoluble poisonous matter in the mineral, but puts the powder in condition to be formed into liquid suspension in water in which the powder does not readily settle out and therefore results in a product which may be practically applied by spraying. For this purpose the powder should, I believe, be sufficiently pulverized to make the particles substantially less than 1/1500 inch in diameter.

The powder may be applied to the vegetables or plants which it is desired to protect from the insects, by dusting the same thereon, or by making a liquid suspension of the insecticide in water and spraying the same on the plants or by mixing the insecticide powder with molasses or other sticky fluid and spreading the same on the plants, or it may be applied in any other suitable manner. The insecticide obtained from Scorodite as described, is particularly useful in combatting the destruction done by the boll weevil on the cotton plant where great quantities of insecticide at small cost are required.

The particles of the powder do not exhibit the usual amorphous or else generally complete crystalline structure characterizing the particles of hitherto known chemically prepared insecticides, but are broken fragments of natural mineralogical structure and generally exhibit the optical properties of the naturally crystallized mineral. Likewise the new insecticides will ordinarily contain the chemical components accompanying such minerals in natural deposits which are entirely foreign to chemically prepared insecticides. When using the Scorodite mineral as a base, for instance, the insecticide will usually contain not only arsenic and iron, but also generally contain copper, silica, etc., and the particles will generally show a resinous or vitreous lustre, and optical properties of fragments of orthorhombic crystalline structure.

If an ore or mineral is used which contains so much water-soluble poison as to disadvantageously affect the plant, this water-soluble matter may be eliminated or reduced by leaching the same out with water, or by adding an agent which will react with the water-soluble matter to render the same insoluble. This is preferably done after the ore is pulverized. Any suitable method may be used for reducing the percentage of disadvantageous water soluble material. If this water-soluble material is not leached out but is fixed to render it substantially insoluble, various fixation agents may be used depending on the particular mineral or ore employed as a base and the chemical condition of the undesirable soluble constituent. Alkaline fixing agents may, however, be used with many minerals, and the oxides of the alkali earth metals and particularly hydrated lime, are found to be most satisfactory in many cases. In treating such minerals as Scorodite, when it is desirable to reduce said water soluble matter, I prefer to place in the mill with every ton of crushed crude ore, about 200 pounds of hydrated lime with very little excess water and continue the grinding until sufficient of the water escapes to enable the finer portions of the powdered material to be removed "dust dry". This fixing treatment may not decrease the percentage of the undesirable water-soluble element by the standard tests of this particular mineral but at least eliminates or decreases its injurious effect on the plants.

To render the poison powder more easily absorbed by the insect, I preferably treat the same with a sliming agent, or an agent which has the effect of lubricating or otherwise affecting the particles so that they pass more readily through small openings and do not form hard lumps or the like which would make absorption of the same by the insect difficult. The poison powder is absorbed by insects with insecticidal result and while the particular manner in which the poisonous powder is absorbed into the body of the insect to produce this result is somewhat doubtful and may vary with different insects, nevertheless it is believed to be by a process of ingestion.

In some cases where the insecticide can be used and applied in the wet pulp or spray form I prefer to proceed as follows. For every ton of ore placed in the mill I add about 10 to 100 lbs. of black strap, crude tannin, stewed oak bark or the like cheap source of sliming agent with about 2 to 4 tons of water. After grinding, the free wet pulp from the mill is passed through a separator tank in which all particles capable of settling at the rate of less than about an inch per minute are overflowed while the larger size particles are settled out and returned to the mill for further treatment. The overflow may be settled and filterpressed and the parts containing about 30% to 50% of water distributed as such while the nearly clear liquor is used as return water to the mill. If a particularly fine grade of pulp is desired for certain classes of spraying operations the slurry may be passed through a colloid mill consisting of opposite running superposed hardened gears or pinions. In either case, should the water-soluble constituents be found to be excessive even after wet grinding, I may add a fixative to the slurry or pulp either before or after filtration. I take care, however, in the selection of sliming agent and fixative so that they shall not in action mutually interfere. For example if hydrated lime is to be used as fixative I may prefer to avoid the use of tannin or oak bark and use black strap as a sliming agent.

In some cases, of course it may be preferable to dry and then repowder the cake, but this is an expense I prefer to avoid by suitable location of grinding and pulping stations to which the ore can be shipped.

In case the mineral or natural ore does not contain a sufficient percentage of poison in available form, the same may be enriched by admixing therewith a compound having therein a greater proportion of insect poison to increase the percentage of available insect poison in the mixture. Other minerals or ores may be used for this purpose which are preferably mixed with the original base before grinding, or chemically prepared products may be admixed after grinding or before.

Many other changes and modifications may be made and the invention embodied in widely different forms hence I do not desire to be limited to the details given but intend to cover all forms and modifications coming within the language or scope of any one or more of the appended claims.

What I claim as new and desire to secure by Letters Patent, is:

1. The method of making an insecticide which consists in taking a natural ore containing an insecticide and grinding the same to a powder sufficiently finely divided for the poison to be absorbed by insects with insecticidal result.

2. The method of making an insecticide which consists in taking a substantially insoluble mineral ore containing a metallic compound insect poison in available form and pulverizing the same to produce a powder therefrom sufficiently finely divided for the poison to be absorbed by insects with insecticidal result.

3. The method of making an insecticide which consists in taking a substantially insoluble mineral ore containing a metallic compound insect poison in available form and pulverizing the same to produce a powder, the particles of which are less than 1/1500 inch in size and sufficiently finely divided for the poison to be readily absorbed by insects with insecticidal result.

4. The method of making an insecticide which consists in taking a substantially insoluble Scorodite ore and pulverizing the same to produce a powder therefrom sufficiently finely divided to be absorbed by insects with insecticidal result.

5. The method of making an insecticide which consists in taking a natural ore containing an insect poison and pulverizing the same to produce a powder therefrom, and admixing therewith a compound having therein a greater proportion of insect poison to increase the percentage of insect poison in the mixture, the whole being sufficiently finely divided for the poisonous matter to be absorbed by insects with insecticidal result.

6. The method of making an insecticide which consists in taking a natural ore containing an insecticide and pulverizing the same to form a powder therefrom, sufficiently finely divided for the poison to be absorbed by insects with insecticidal result, and treating the material to decrease the proportion of water-soluble matter therein.

7. The method of making an insecticide which consists in taking a mineral ore containing an insecticide poison and pulverizing the same to form a fine powder therefrom and treating the material with a sliming agent to render it more readily absorbed by insects with insecticidal result.

8. The method of making an insecticide which consists in taking a substantially insoluble Scorodite ore and pulverizing the same to produce a powder therefrom, and admixing therewith a compound having therein a greater proportion of insect poison to increase the percentage of insect poison in the mixture, the whole being sufficiently finely divided for the poisonous matter to be absorbed by insects with insecticidal result.

9. The method of making an insecticide which consists in taking a Scorodite ore and pulverizing the same to form a powder therefrom, sufficiently finely divided for the poison to be absorbed by insects with insecticidal result, and treating the material to decrease the proportion of water soluble matter therein.

10. The method of making an insecticide which consists in taking a substantially insoluble Scorodite ore and pulverizing the same to form a fine powder therefrom and treating the material with a sliming agent to render it more readily absorbed by insects with insecticidal result.

11. The new insecticide containing as a base a natural ore containing an insecticide, the same being in pulverized condition and sufficiently finely divided for the poison to be absorbed by insects with insecticidal result.

12. The new insecticide containing as a base a substantially insoluble mineral containing a metal compound insecticide in form available for insecticidal purposes, the same being in powdered condition and sufficiently finely divided for the poison to be absorbed by insects with insecticidal result.

13. The new insecticide comprising the mineral Scorodite as a base, the same being in powdered condition and sufficiently finely divided for the poison to be absorbed by insects with insecticidal result.

14. The new insecticide containing as a base a substantially insoluble mineral ore containing a metal compound insecticide in form available for insecticidal purposes, the same being in powdered condition and having admixed therewith a compound having therein a greater proportion of insect poison whereby the percentage of insect poison in the mixture in increased, the whole being in sufficiently finely divided condition for the poisonous matter to be absorbed by insects with insecticidal result.

15. The new insecticide comprising a mineral ore containing a metal compound insect poison, the same being in powdered condition and sufficiently finely divided for the poison to be absorbed by insects with insecticidal result, and the powder being treated with a sliming agent whereby it is in condition to be more readily absorbed by insects.

16. The new insecticide comprising a substantially insoluble Scorodite ore as a base, the same being in powdered condition and sufficiently finely divided for the poison to be absorbed by insects with insecticidal result, and the powder being treated with a sliming agent whereby it is in condition to be more readily absorbed by insects.

17. The method of making an insecticide which consists in taking a natural ore containing an arsenical insecticide and grinding the same to a powder sufficiently finely divided for the poison to be absorbed by insects with insecticidal result.

18. The new insecticide containing as a base a mineral containing a substantially insoluble arsenical insect poison in form available for insecticidal purposes, the same being in powdered condition and sufficiently finely divided for the poison to be absorbed by insects with insecticidal result.

19. An insecticide containing as its essential ingredient native arsenate of iron reduced to a powdered form of a fineness suitable for spraying or dusting purposes.

20. An insecticide comprising a finely pulverized ore containing native arsenate of iron.

In testimony whereof I have signed my name to this specification.

HOWARD W. AMBRUSTER.